April 5, 1938. P. L. LAKE 2,113,211
RENEWABLE FITTING FOR PARALLEL CORRUGATED FLEXIBLE HOSE
Filed March 18, 1937

INVENTOR
Philip L. Lake
BY Francis E. Boyce
ATTORNEY

Patented Apr. 5, 1938

2,113,211

UNITED STATES PATENT OFFICE 2,113,211

RENEWABLE FITTING FOR PARALLEL CORRUGATED FLEXIBLE HOSE

Philip L. Lake, Belleville, N. J.

Application March 18, 1937, Serial No. 131,564

7 Claims. (Cl. 285—72)

This invention relates to renewable fittings for parallel corrugated flexible hose, the principal object of the invention being to provide a fitting which is adapted to engage one of the parallel corrugations of the hose and effectively retain the hose and its braided covering in fixed relation within the fitting.

A further object of the invention is to provide a fitting comprising a minimum number of parts and which can readily be removed from a broken end of the hose and replaced on said hose without the use of special tools.

Other objects and advantages of the invention will appear as the description proceeds.

In the drawing accompanying this specification,

Figure 1:
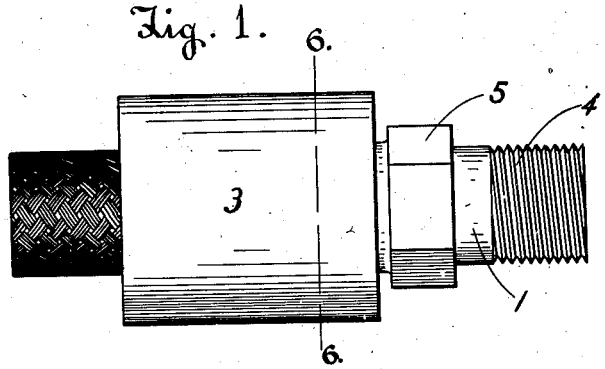
Fig. 1 is a side elevation of a fitting constructed in accordance with the present invention and showing a piece of hose secured therein.

The manufacture of flexible metallic hose having parallel corrugations as distinguished from helical corrugations, is a comparatively new art. In order to impart a sufficient degree of flexibility to the hose, the wall of the tube from which it is to be formed must be drawn to extreme thinness, and this weakens the tube so that in order to enable it to withstand high internal pressure, it must be protected by an outer covering usually of braided metal. Because of the necessity of retaining the ends of the hose and its braided metal covering in a certain fixed relation it has been difficult to provide a fitting of simple construction which will effectively accomplish the desired purpose, and yet be readily removable from a broken hose without injury to the fitting. The present invention is intended to meet this difficulty by providing a fitting having a minimum number of parts, and which when assembled on the end of the hose will effectively retain it and its covering braid in proper relation from which fitting a broken end of the hose may readily be removed and the fitting replaced on an unbroken end of said hose.

Referring to the drawing, and especially to Figs. 1 to 6, the fitting comprises three essential parts, namely, an inner or male member 1, an intermediate or female member split longitudinally into two parts 2 and 2ª, and an exterior collar 3.

Figure 2:
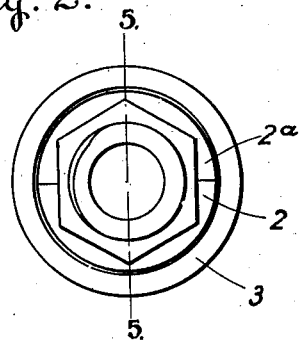
Fig. 2 is an end view of Fig. 1.
Figure 4:
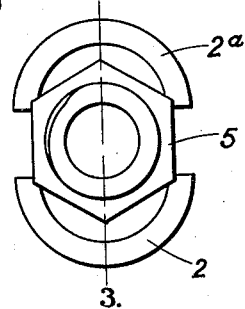
Fig. 4 is an end view of the parts of the fitting shown in Fig. 3.

The male member 1 is longitudinally bored, the diameter of the bore corresponding to the effective diameter of the opening through the hose with which it is to be used. The said member 1 is exteriorly threaded over a portion of its length, as shown at 4, for connection with an interiorly threaded pipe or other connection, and at another portion of its length has formed thereon a shouldered portion 5 which is preferably flatted at its circumference, as shown in Figs. 1, 2, and 4, for the reception of a wrench.

The parts 2 and 2ª constituting the female member are of semi-tubular formation, the bore formed by the two parts when brought into abutting relation being of such diameter as to fit snugly around the male member 1. The parts 2 and 2ª are each provided at its interior with a shouldered portion 6 whereby when the parts are in abutting relation a complete annular shoulder is formed therein which shoulder is inclined or beveled at one side thereof for cooperation with the beveled end of the male member 1, as hereinafter more fully described. At the point where the beveled side of the shoulder 6 merges into the wall of the parts 2 and 2ª, a shallow groove 7 is formed in said wall for a purpose which will appear in the description of the operation of the device.

Figure 3:
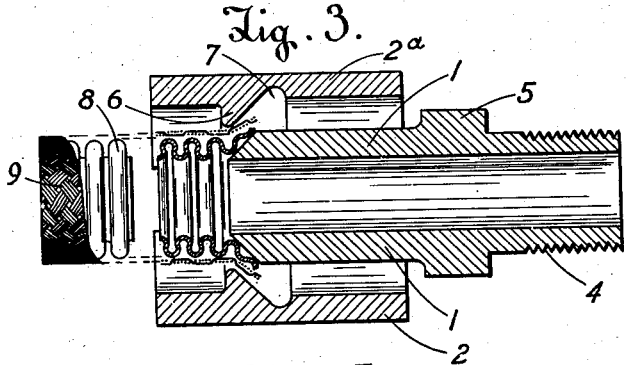
Fig. 3 is a central longitudinal section taken on the line 3—3 of Fig. 4, illustrating a step in the method of assembling the fitting on the hose.
Figure 5:
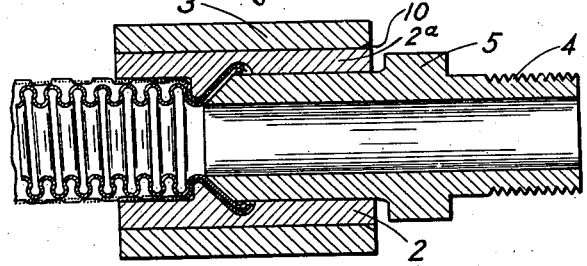
Fig. 5 is a longitudinal sectional view taken on the line 5—5 of Fig. 2.
Figure 6:
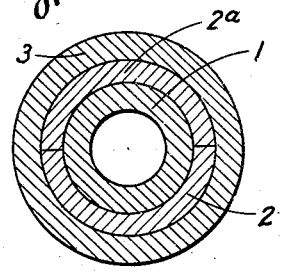
Fig. 6 is a transverse sectional view taken on the line 6—6 of Fig. 1.

In the drawing, 8 designates the flexible metal hose having parallel corrugations, and 9 designates the metal braid covering which is woven closely around the hose. The operation of applying the fitting to the hose is as follows:

A solid metal core, (not shown) of a diameter corresponding to the inner diameter of the hose is inserted through the bore of the member 1 so that the end thereof will project beyond the inner end of said member. The end of the hose is then passed over the projecting end of said core and seated on the beveled end of the member 1. The metal braid covering 9 is then slipped back on the hose leaving the latter exposed at the seated end. The parts 2 and 2ª constituting the intermediate member are then placed in encircling relation to the member 1 as shown in Figs. 3 and 4, and thereupon pressed together in a vise. This preliminary pressure serves to compress the end of the hose between the beveled end of the member 1 and the beveled side of the internal shoulder 6 of the intermediate member 2, 2ᵃ. After this preliminary operation the pressure of the vise is released and the parts 2, 2ᵃ removed. Then the end of the braided metal cover 9 is returned to its place over the end of the hose and the parts 2, 2ᵃ replaced thereon and again subjected to pressure in a vise, sufficient pressure being exerted on said parts to bring their opposing edges into abutting relation. With the parts 2, 2ᵃ thus held, one end of the exterior sleeve 3 is placed over the end of the intermediate split sleeve 2, 2ᵃ, the lead end of the sleeve 3 being slightly beveled inwardly as indicated at 10, Fig. 5, to facilitate engagement of the ends of the sleeves, and the sleeve 3 is forced under pressure on to split sleeve 2, 2ᵃ until the two sleeves are in tight engagement throughout their length. The sleeve 3 thus securely clamps the split sleeve 2, 2ᵃ on the inner member 1, causing the annular shoulder 6 to enter one of the corrugations of the hose and at the same time clamping the end of the hose and its braided covering between the jaws formed by the beveled end of the member 1 and the beveled side of the shoulder 6, any surplus length of the hose and braid being forced into the annular groove 7, all as shown in Fig. 5. It will thus be seen that the clamping pressure of the fitting is exerted evenly around the hose and its braid so that there is little likelihood of breakage of the hose or its braid under pressure within the fitting. On the other hand, if the hose should become broken outside of the fitting, it is necessary only to cut off the broken part with the fitting thereon, and then, after clamping the fitting in a vise, by applying a tubular tool to the end of the split sleeve 2, 2ᵃ the said split sleeve may readily be driven out of the sleeve 3, taking with it the member 1 and the broken end of the hose, whereupon the split sleeve may be separated, the broken hose removed and the fitting replaced on the new end of the hose in the manner already described.

Figure 7:
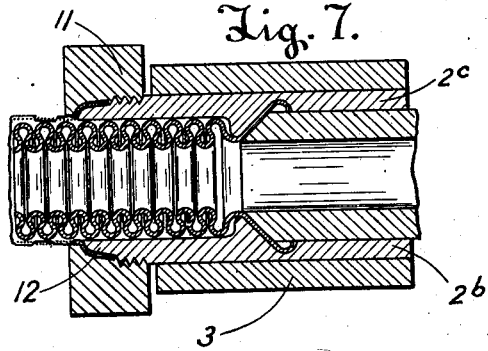
Fig. 7 is a longitudinal sectional view similar to Fig. 5, but showing a modified form of fitting broken away at one end.

In the form shown in Fig. 7, the intermediate split sleeve, comprising the members 2ᵇ, 2ᶜ, is somewhat longer than the outer sleeve 3 and is provided with an exteriorly threaded portion for engagement with a nut 11, and at its extreme end, beyond said threaded portion the said split sleeve is tapered and rounded as indicated at 12, the bore of the nut being similarly formed so that when threaded on the split sleeve the tapered and rounded portions of sleeve will be in engagement with the similarly formed wall of the nut. In this form the braided hose covering is clamped between the tapered portions of the nut and sleeve so that it is anchored separately from the hose.

Figure 8:
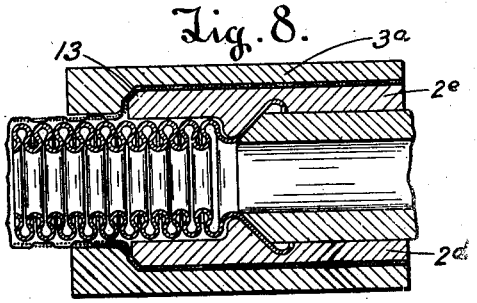
Fig. 8 is a view similar to Fig. 7, showing a further modified form of the fitting.

In the form shown in Fig. 8, the outer or clamping sleeve 3ᵃ is longer than the intermediate split sleeve 2ᵈ, 2ᵉ, that portion of the wall of said outer sleeve which extends beyond the split sleeve being thickened to provide a shoulder 12 against which the end of the split sleeve abuts when the sleeves are assembled on the end of the hose. In this form the fit between the intermediate and outer sleeves is such as to receive between them the braided covering of the hose so that when the outer sleeve is driven on to the split sleeve the said braided covering will be clamped between the two sleeves over the entire length of the split sleeve and between the end of the latter and the shoulder 12 formed in the outer sleeve.

Having thus described my invention, what I claim is:

1. A fitting for corrugated metal hose, comprising an inner tubular member, a split sleeve encircling said member, and an outer sleeve encircling said split sleeve and maintaining it in clamping engagement with said inner member, said split sleeve and inner member having cooperating surfaces for clamping an end of the hose between them and said split sleeve having an inwardly projecting annular shoulder for engaging one of the corrugations of the hose.

2. A fitting for corrugated metal hose, comprising an inner tubular member, a split sleeve encircling said member, and an outer sleeve encircling said split sleeve and maintaining it in clamping engagement with said inner member, said split sleeve and inner member having cooperating surfaces disposed at an angle to their longitudinal axes for clamping an end of the hose between them and said split sleeve having an inwardly projecting annular shoulder for engaging one of the corrugations of the hose.

3. A fitting for corrugated metal hose, comprising an inner tubular member, a split sleeve encircling said member, and an outer sleeve encircling said split sleeve and maintaining it in clamping engagement with said inner member, said split sleeve and inner member having cooperating surfaces disposed at an angle to their longitudinal axes for clamping an end of the hose between them and said split sleeve having an inwardly projecting annular shoulder for engaging one of the corrugations of the hose, said split sleeve also having an internal annular groove disposed in position to receive the inner end of the hose.

4. A fitting for corrugated metal hose, comprising an inner tubular member, a split sleeve encircling said member, and an outer sleeve encircling said split sleeve and maintaining it in clamping engagement with said inner member, said split sleeve having an inwardly projecting annular shoulder, one side of said shoulder lying in a plane inclined to the axis of the sleeve, the end of said inner member being similarly inclined in relation to its axis and adapted to abut against the inclined side of said shoulder thereby to grip the end of the hose between said inclined surfaces, said shoulder being disposed in position to engage one of the corrugations of the hose.

5. A fitting for corrugated metal hose, comprising an inner tubular member, a split sleeve encircling said member, and an outer sleeve encircling said split sleeve and maintaining it in clamping engagement with said inner member, said split sleeve having an inwardly projecting annular shoulder, one side of said shoulder lying in a plane inclined to the axis of the sleeve, the end of said inner member being similarly inclined in relation to its axis and adapted to abut against the inclined side of said shoulder thereby to grip the end of the hose between said inclined surfaces, said shoulder being disposed in position to engage one of the corrugations of the hose, said split sleeve having an annular groove in its wall at the base of the inclined side of said shoulder.

6. A fitting for corrugated metal hose having a braided metallic covering, said fitting comprising an inner tubular member, a split sleeve encircling said member, and an exterior sleeve encircling said split sleeve and maintaining it in clamping engagement with said inner member, said split sleeve having a portion extending beyond said outer sleeve and exteriorly threaded over a part of its length and having a tapered and rounded portion beyond said threaded part, a nut in engagement with said threaded part and having an interiorly tapered and rounded portion cooperating with the tapered and rounded portion of the sleeve for clamping the braided covering therebetween, said split sleeve and inner member having cooperating surfaces inclined with relation to their axes for clamping the end of the corrugated hose therebetween.

7. A fitting for corrugated metal hose having a braided metallic covering, said fitting comprising an inner tubular member, a split sleeve encircling said member, said split sleeve and inner member having cooperating abutting surfaces for clamping the end of the corrugated hose between them, the braided covering being disposed around said split sleeve, and an outer sleeve encircling said covering thereby to retain the same on the split sleeve and to maintain the latter in clamping engagement with the inner member, said outer sleeve having a portion extending beyond the split sleeve, the bore of said extended portion being of smaller diameter than the exterior diameter of the split sleeve thereby to provide a shoulder within the outer sleeve to abut against the end of the split sleeve and clamp the braided metallic covering in a position at an angle to its longitudinal axis.

PHILIP L. LAKE.